United States Patent [19]

Ells

[11] Patent Number: 5,028,087
[45] Date of Patent: Jul. 2, 1991

[54] PORTABLE THERMAL BARRIER

[76] Inventor: James R. Ells, 3311 Harbor View Drive, Gig Harbor, WA 98335

[21] Appl. No.: 410,942

[22] Filed: Sep. 21, 1989

[51] Int. Cl.$^5$ .............................................. B60P 3/20
[52] U.S. Cl. .................................... 296/24.1; 410/118; 160/327
[58] Field of Search ............................ 296/24.1, 39.3; 410/118, 151, 152, 143; 62/329, 447; 160/327, 328, 354, 368.1, 370.1

[56] References Cited

U.S. PATENT DOCUMENTS

| | | | |
|---|---|---|---|
| 1,192,231 | 7/1916 | Scott | 410/118 |
| 1,651,626 | 12/1927 | Parker | 62/329 |
| 1,704,758 | 3/1929 | Meinhardt | 296/24.1 X |
| 1,833,034 | 11/1931 | Parker | 62/329 |
| 1,965,802 | 7/1934 | Phillips | 62/329 |
| 2,026,855 | 1/1936 | Whyte | 62/329 |
| 2,565,997 | 8/1951 | Stone | 296/24.1 X |
| 3,057,284 | 10/1962 | Learmont | 296/24.1 X |
| 3,438,149 | 4/1969 | Ilg | 62/329 |
| 3,638,450 | 2/1972 | Falk | 62/329 |
| 3,767,253 | 10/1973 | Kletsch | 410/118 |
| 4,366,977 | 1/1983 | Davis et al. | 49/477 |
| 4,396,325 | 8/1983 | Joice-Cavanagh | 410/151 X |
| 4,669,934 | 6/1987 | Wisecarver | 410/145 |

FOREIGN PATENT DOCUMENTS

3635119 5/1987 Fed. Rep. of Germany ...... 410/118

Primary Examiner—Margaret A. Focarino
Assistant Examiner—Joseph D. Pape
Attorney, Agent, or Firm—Wells, St. John & Roberts

[57] ABSTRACT

A portable thermal barrier is disclosed for thermally dividing an enclosure. In a preferred form, the barrier includes a flexible thermal sheet formed by two separable sheet forms that may be folded and stored in a holder such as a bag. The sheet forms may be laid out and releasably joined along inside edges to span the enclosure. Outer foldable flaps of the sheet forms are adjustably positionable adjacent wall surfaces of the enclosure to adjust for varying size enclosures. Opposed top and bottom flap sections fold over onto the sheet, such that outward folded surfaces are selectively positioned adjacent top and bottom wall surfaces of the enclosure. Pockets along side flap sections of the sheet forms receive opposed foot plates of extensible load locks. The load locks are manually extendible to secure the thermal sheet in place against the walls of the enclosure.

19 Claims, 9 Drawing Sheets

PORTABLE THERMAL BARRIER

TECHNICAL FIELD

The present invention relates to thermal isolation of different areas within refrigerated containers and particularly portable refrigerated containers such as insulated cargo containers used with semi-trucks.

BACKGROUND OF THE INVENTION

Considerable difficulty and inconvenience has been experienced when thermally insulated containers, such as the refrigeration units of tractor-trailers, are to be used with a "short" load where the load does not occupy the entire volume of the trailer. The associated refrigeration units must operate inefficiently to cool the entire enclosure rather than just the area occupied by the load.

Another difficulty is experienced when containers are to be used for contents that must be kept at different temperatures. Ice cream, for example, is typically transported at approximately 0° F. Fresh vegetables, on the other hand, do not require freezing temperatures. A thermal barrier must therefore be placed between the frozen materials and the remaining materials that are desired to be kept cool but not frozen.

As a solution to this problem, various manufacturers have produced rigid barrier structures that may be assembled within an insulated container to isolate a desired area of the container. Such barriers provide a thermal "break" to facilitate shipment or storage of materials that require different surrounding air temperatures. Such barriers are effective but are not easily adapted to containers having differing internal wall configurations or dimensions. Additionally, the rigid barrier structures are very expensive, bulky and difficult to handle.

The present thermal barrier is provided to effectively thermally isolate the interior of a container while providing distinct advantages over the prior, rigid barrier configurations.

It is a primary object of the present invention to provide a thermal barrier that is portable in nature and that may be easily stored in a compact configuration for ease in transport and storage.

Another object is to provide such a barrier that is easily adapted to conform to container interior wall structures having varying dimensions.

Another object is to provide such a barrier that can be installed utilizing conventional load locks that are typically used to secure a load in place within a thermal container such that the load lock may be used both to secure the cargo load and to support the thermal barrier.

A still further important object is to provide such a device that is easily installed and removed, requiring minimal time and effort by the installer.

These and still further objects and advantages will become apparent upon reading the following description which, taken with the accompanying drawings, exemplify a preferred form of the invention.

BRIEF DESCRIPTION OF THE DRAWINGS

A preferred embodiment of the invention is exemplified in the accompanying drawings, in which.

DETAILED DESCRIPTION OF THE PREFERRED EMBODIMENTS

The following disclosure of the invention is submitted in furtherance with the constitutional purpose of the Patent Laws "to promote the progress of science and useful arts" (Article 1, Section 8).

Figure 11:
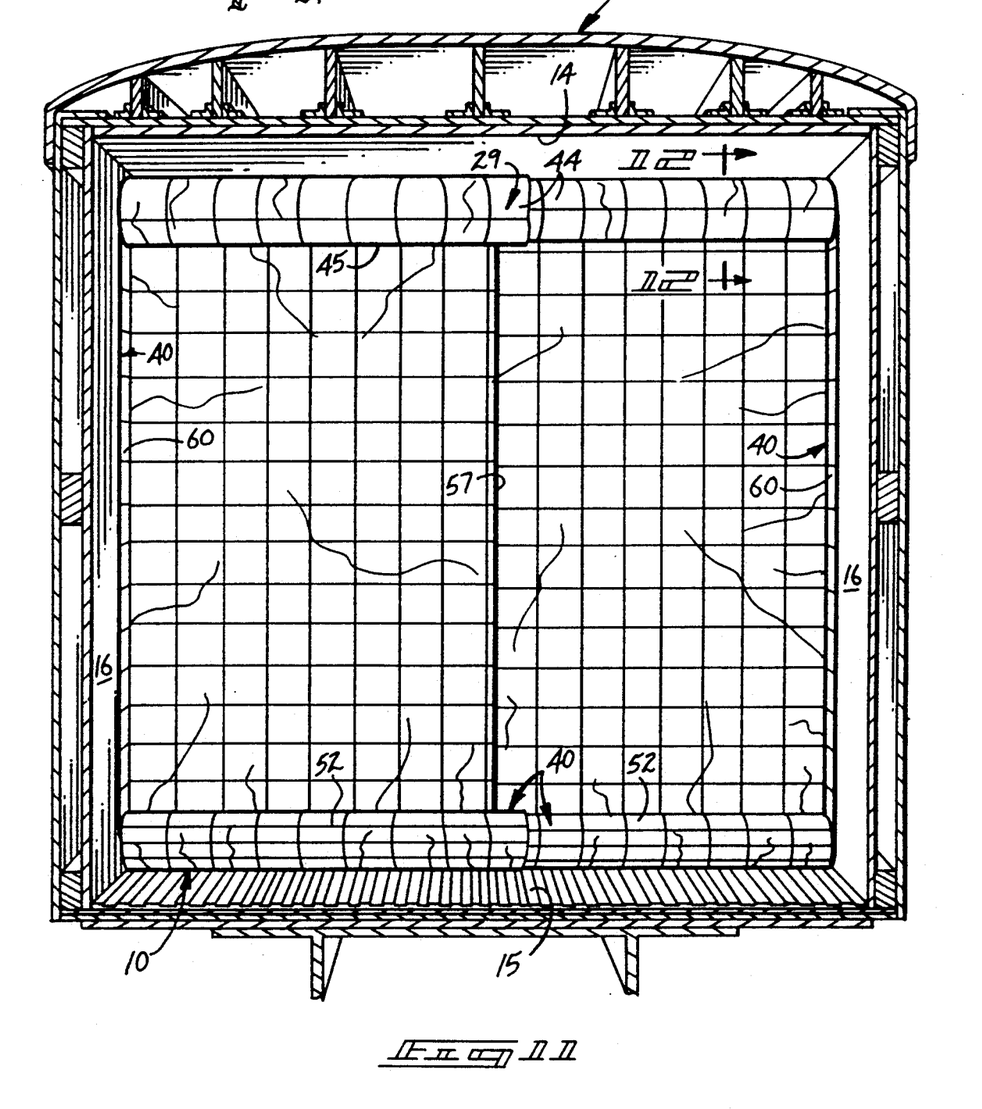
FIG. 11 is a view illustrating a completed installation of the present thermal barrier.

A preferred form of the present portable thermal barrier is generally designated in the drawings by the reference numeral 10 (FIG. 11). The portable thermal barrier 10 is provided for use within an enclosure 12, such as a refrigerated trailer, van, cargo bin, etc.

The barrier 10 is provided to fit within the enclosure 12 and adjacent peripheral wall surfaces of the enclosure to present a resistance to thermal conductivity between different areas within the enclosure.

For purposes of later description, the wall surfaces of the enclosure include a top or ceiling surface 14 and an opposed bottom of floor surface 15. The wall surfaces 13 also include opposed side wall surfaces 16 extending between the top and bottom surfaces 14, 15.

It should also be pointed out that although barrier 10 is shown in relation to enclosures having rectangular cross sections, it may on occasion be used with enclosures having irregular or non-rectangular cross sections. The cross sectional shape of the container may dictate the peripheral profile of the thermal barrier 10. However, it is typical that the enclosure will have a generally rectangular cross sectional configuration substantially as shown.

The present portable thermal barrier 10 is provided to be installed within the enclosure 12 through use of a load lock 20. The load lock 20 may be a substantially conventional unit that finds commonplace use especially in the trucking industry for holding a load in position within a truck van or cargo box. The load lock includes an elongated telescoping extensible member 23 that may be selectively extended or retracted by means of a jack and rachet mechanism 24. Opposed ends of the load lock include foot plates 25. The foot plates 25 are typically used to abut opposed wall surfaces 16 of an enclosure to secure a partial load in place.

The jack and rachet mechanism 24 is used to secure the load lock in position by exerting opposed outward forces against the foot plates 25. The jack and rachet mechanism 24 is also selectively operable to release the outward forces and allow the foot members 25 to be selectively moved together to facilitate removal from the enclosure.

The portable thermal barrier 10, when assembled, is basically formed of a flexible thermal sheet 29 (FIG. 3) having a peripheral size to substantially match the cross sectional configuration of the enclosure 12 and is held in place within the enclosure by load locks 20. It is pointed out that the load locks 20 used with the present barrier 10 may have dual utility; to hold the present barrier in place, and to hold the load in place within the enclosure.

Figure 1:
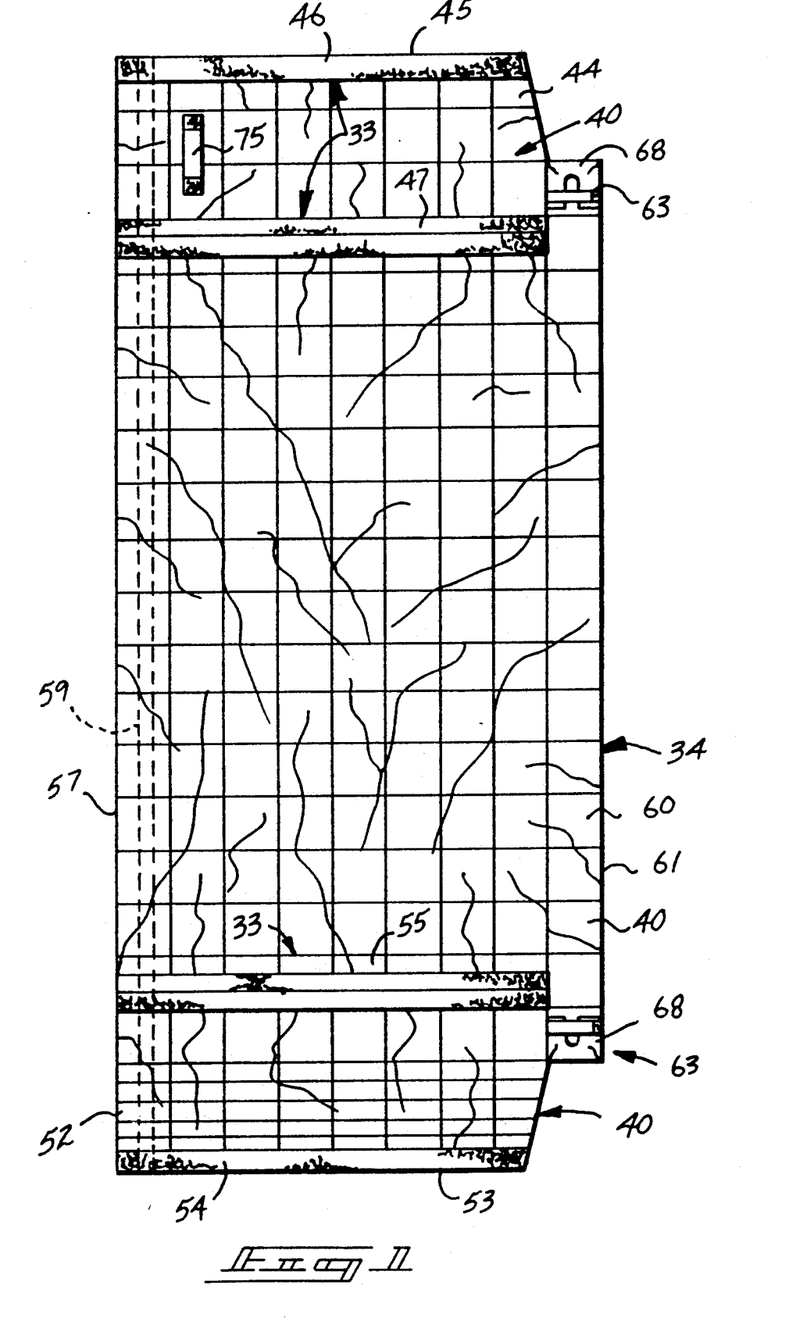
FIG. 1 is a plan view of a sheet form section of the present barrier.
Figure 2:
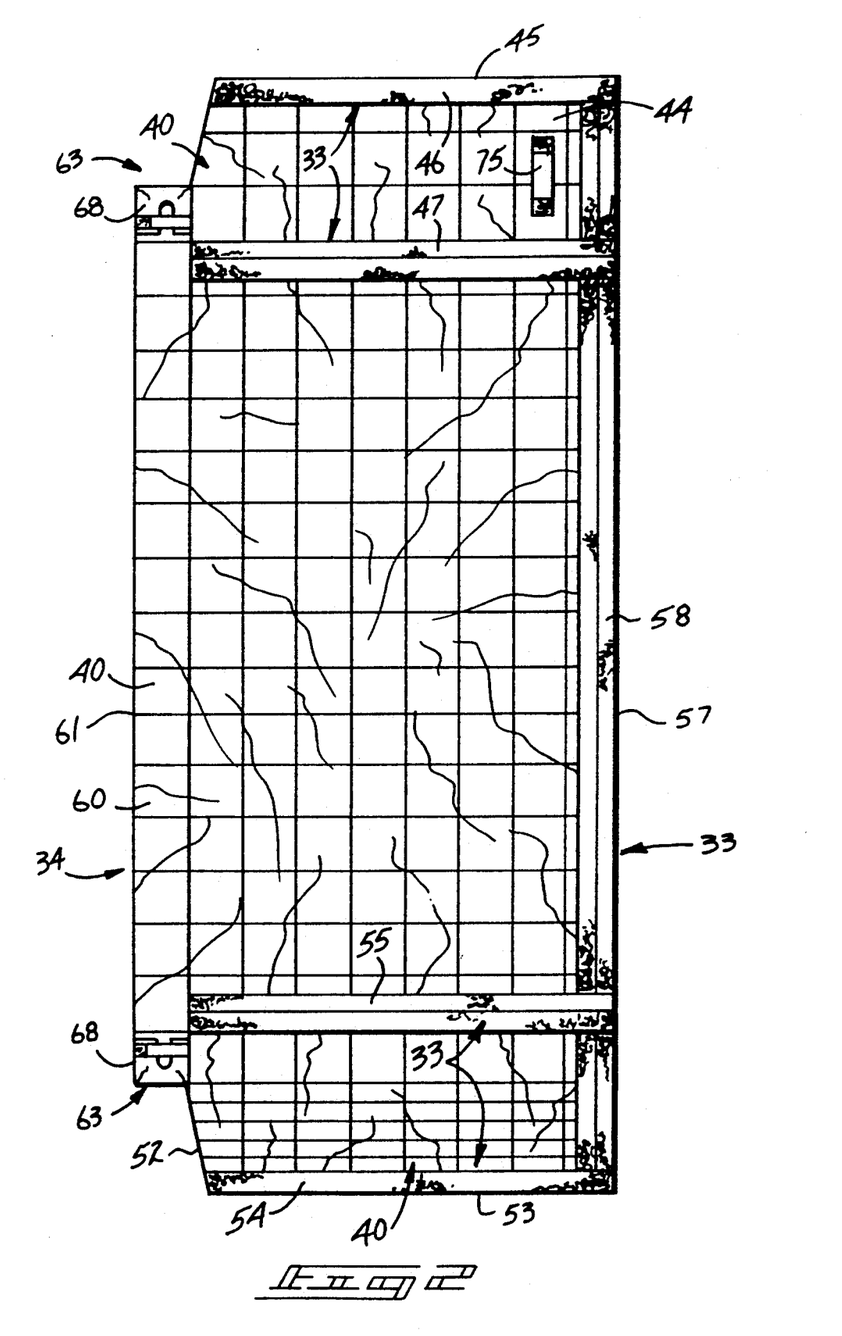
FIG. 2 is a view similar to FIG. 1 only showing an opposite sheet form section.
Figure 3:
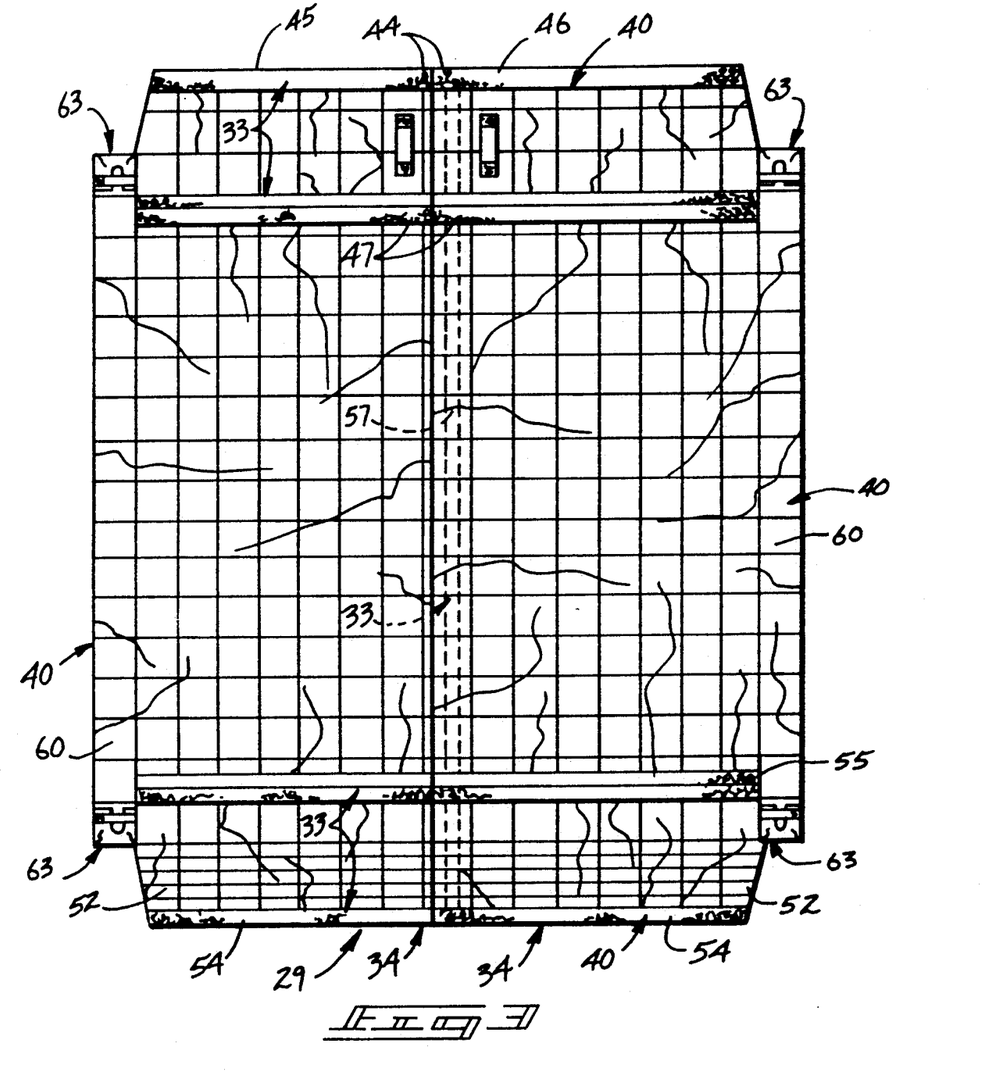
FIG. 3 is a view showing the sheet form sections of FIGS. 1 and 2 assembled.

It is advantageous that the thermal sheet 29 be formed in two separable sheet forms 34 which, when assembled as shown in FIG. 3, span the cross sectional area of the enclosure. The two separable sheet forms 34 may be substantially mirror images of one another as illustrated in FIGS. 1 and 2. The sheet forms 34 overlap as shown in FIG. 3 and are releasably secured to one another to complete the thermal sheet 29.

The sheet forms 34 are connected by a fastener means 33. Such fastener means may be a conventional form of hook-and-loop fastener such as "VELCRO" (TM) brand fasteners. The particular fastener means 33 is advantageously also used at several locations about the sheet forms 34 as will be further understood below.

Figure 6:
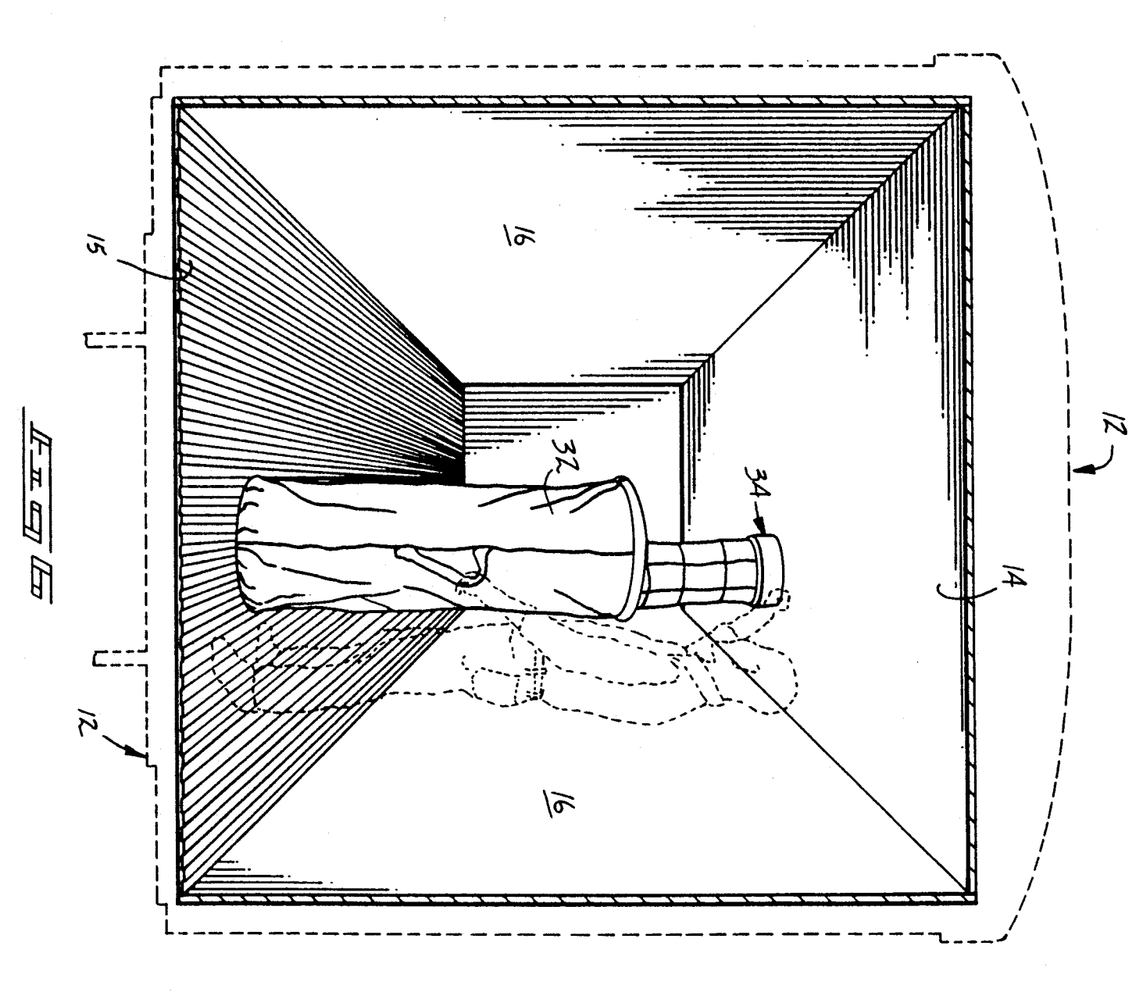
FIG. 6 is a diagrammatic view illustrating removal of a sheet form section from a carrying bag.

Preferably, the thermal sheet material is sufficiently flexible to facilitate rolling of the forms 34 into a compact, storage roll as illustrated in FIG. 6. Such flexibility facilitates storage and transport of the thermal sheets in a convenient carrying bag 32.

Figures 4, 5:
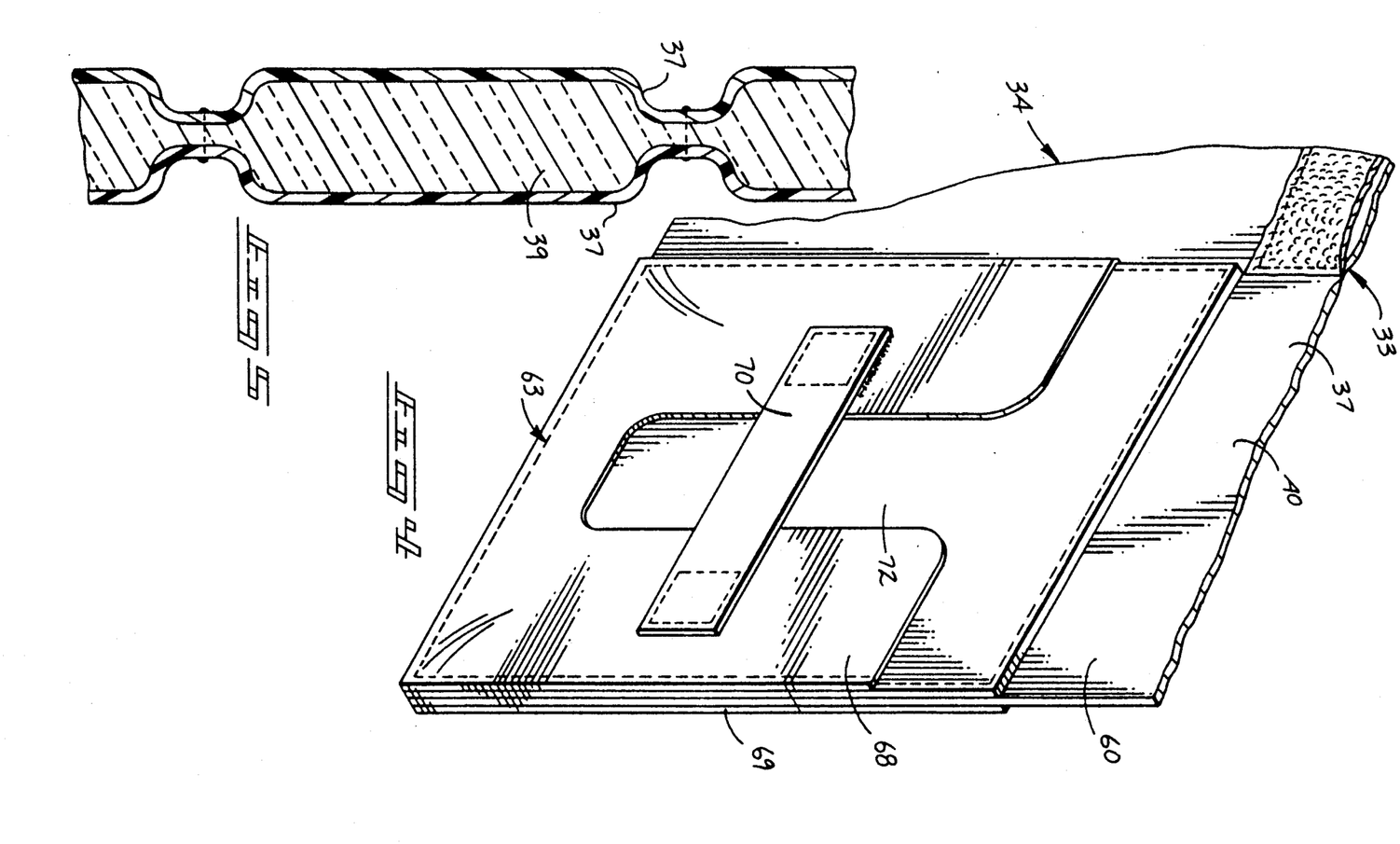
FIG. 4 is an enlarged fragmentary view of a pocket for receiving the foot plate of a load lock, said pocket being typical for both sheet forms.
FIG. 5 is an enlarged, fragmented sectional view illustrating detailing internal components of the present sheet forms.

The thermal sheet material is advantageously formed as a flexible quilted sheet. The sheet will include outwardly facing flexible layers 37, and an internal insulation material 39. A diagrammatic detail of a cross section through a portion of the sheet is shown in FIG. 5.

It is preferred that outwardly facing layers 37 have highly reflective surfaces. A preferred material for the layers 37 is presently marketed under the trademark "Bruntuff Energy Shield" produced by Bruin Plastics of Glendale, R.I.

A preferred filler or insulated material between the layers 37, is a closed cell irradiated polyurethane foam. The preferred thickness of the sheet, including the polyurethane foam filler, is between one-quarter and one-half inch. The insulative "R" value of the sheet at one-quarter inch is approximately 8.4, while the "R" value of a one-half inch thick sheet is approximately 16.5.

In a preferred embodiment, the sheet forms are quilted in order to maintain the foam filler 39 in position between the sheet surfaces and to maintain flexibility of the sheets during installation and removal thereof. Experimentation has indicated that the quilts be approximately six inches square. Six-inch square quilting allows the barrier to fold conveniently at uniform dimensions. The quilts are preferably formed by standard sewing techniques.

The thermal sheet includes integral peripheral flaps 40. The flaps 40 are foldable in order to form outwardly facing flap surfaces for selective positioning adjacent to or in engagement with selected peripheral wall surfaces of the enclosure. The flaps 40 extend about the entire periphery of the assembled thermal sheet as indicated in FIG. 3.

More specifically, the integral peripheral flaps 40 include a top flap section 44 on each of the two sheet forms 34. The top flap section 44 extends across the width dimension of the sheet. The top flap section 44 includes an outward edge 45.

Figure 12:
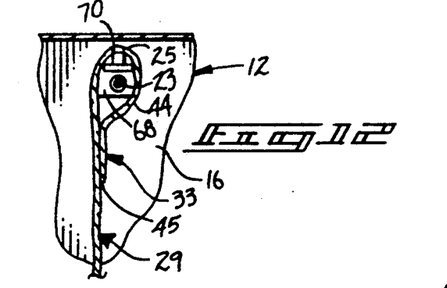
FIG. 12 is a fragmented sectional view taken substantially along line 12—12 in FIG. 11.

A part of the fastener means 33 briefly described above includes a strip of fastener material 46 provided along the edge 45. Also provided is a mating strip of material 47 along one of the facing layers of the sheet for mating engagement with the strip 46 when folded onto the sheet as shown in FIGS. 11 and 12.

The strips 46 and 47 are of sufficient width to allow overlap adjustment of the folded over part of the top flap section 44. This facilitates selective adjustment of the top flap section 44 in relationship to the top enclosure wall surface 14 to maximize the effectiveness of the thermal barrier. This relationship is best shown in FIGS. 11 and 12.

The integral peripheral flaps 40 also includes a bottom flap section 52 formed by the assembled sheet forms 34. The bottom flap section 52 includes an outward edge 53.

Fastener means 33 further includes a fastener strip 54, supplied along the edge 53 for selective engagement with a mating fastener strip 55 upward of the edge 53 to form a bottom fold (FIG. 11).

The arrangement of the strips along the bottom flap section 52 is similar or identical to the strips at the top flap section 44. These strips facilitate adjustment of the fold at the bottom enclosure surface as seen in FIG. 11.

Each of the individual separable sheet forms 34 also includes an inner edge 57. The fastener means at edges 57 include hook-and-loop fastener strips 58 and 59 positioned along their lengths to facilitate assembly of the sheet forms to comprise the thermal sheet 29 as shown in FIG. 3. Again, the strips 58 and 59 are wide in order to facilitate dimensional adjustments to match the corresponding dimension of cross sectional profile of the enclosure.

Side flap sections 60 are provided on each of the sheet forms 34. The side flap sections 60 extend between the top flap section 44 and bottom flap section 52. Side flap sections 60 include outward peripheral edges 61.

Figure 9:
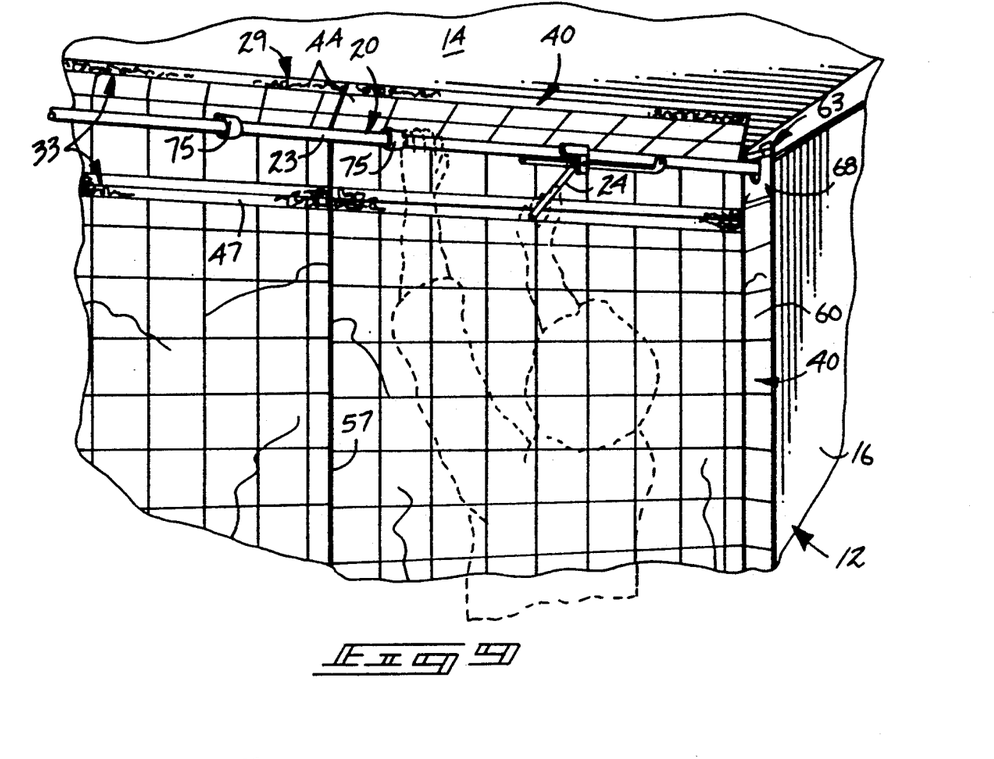
FIG. 9 is a fragmented operational view illustrating the step involved for securing a top end of the barrier within an enclosure.
Figure 10:
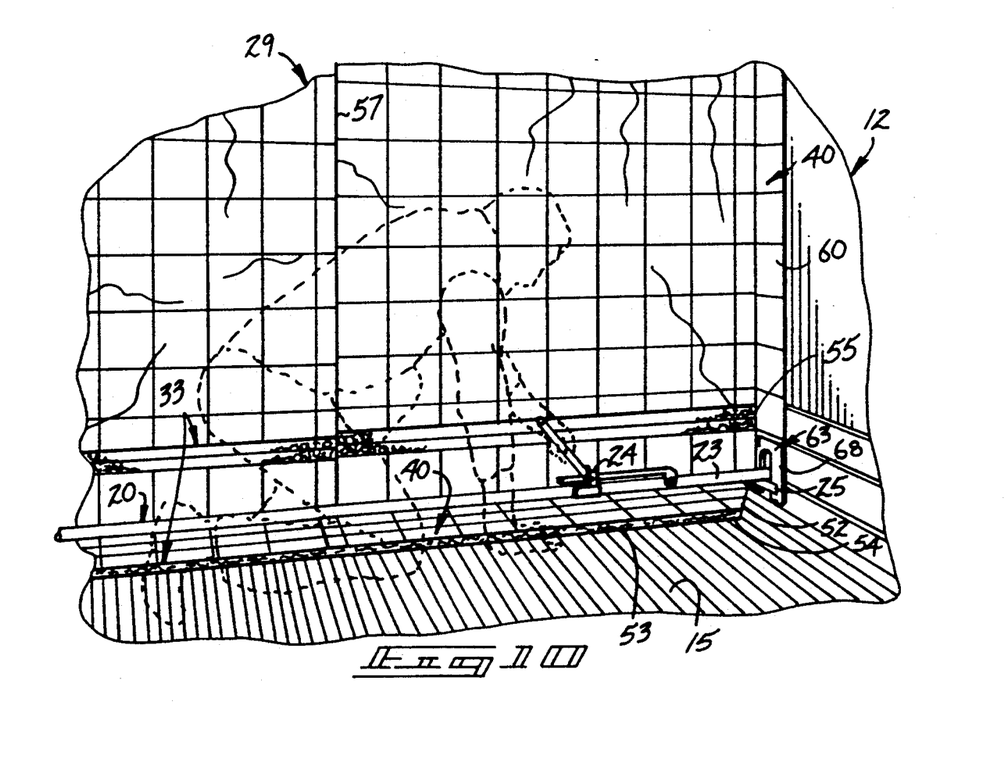
FIG. 10 is an operational view illustrating installation of the bottom end of the present barrier sheet.

The side flap sections 60 are foldable along seams in the quilting configuration of the sheet forms 34. The seams are oriented to enable positioning of the side flap sections 60 in flush engagement with the adjacent wall surfaces 16 of the enclosure (FIG. 9, 11).

Attachment means 63 are provided adjacent selected peripheral edges of the sheet forms in order to receive the foot plates 25 of load locks 20. The attachment means enable the thermal sheet to be selectively secured against the enclosure wall surfaces to extend across the cross sectional configuration of the enclosure and thereby thermally divide the enclosure.

The attachment means 63 is preferably comprised of pockets 68 that are formed into the thermal sheet adjacent the selected side edges 61. The pockets, one of which is shown in detail by FIG. 4, may be reinforced with heavy, durable backing strips 69 to avoid excessive wear of the sheet material.

Each pocket includes a recess 72 to loosely receive the extensible member 23 of a load lock 20. A holding strap 70 is provided on each pocket to span the recess 72. The holding straps 70 may be selectively engaged by means of hook-and-loop fastener material to extend across the recesses 72 and lock the load lock feet 25 within the pockets 68.

Another set of holding straps 75 are provided along the top flap section 44. Holding straps 75 are used to form a loop closure about the extensible member 23 of a load lock in order to hold the top flap section 44 in position in relation to the engaged load lock as the thermal sheet is being installed (FIG. 9).

Operation of the present portable thermal barrier may be readily understood from the foregoing description and the following installation description.

Figure 7:
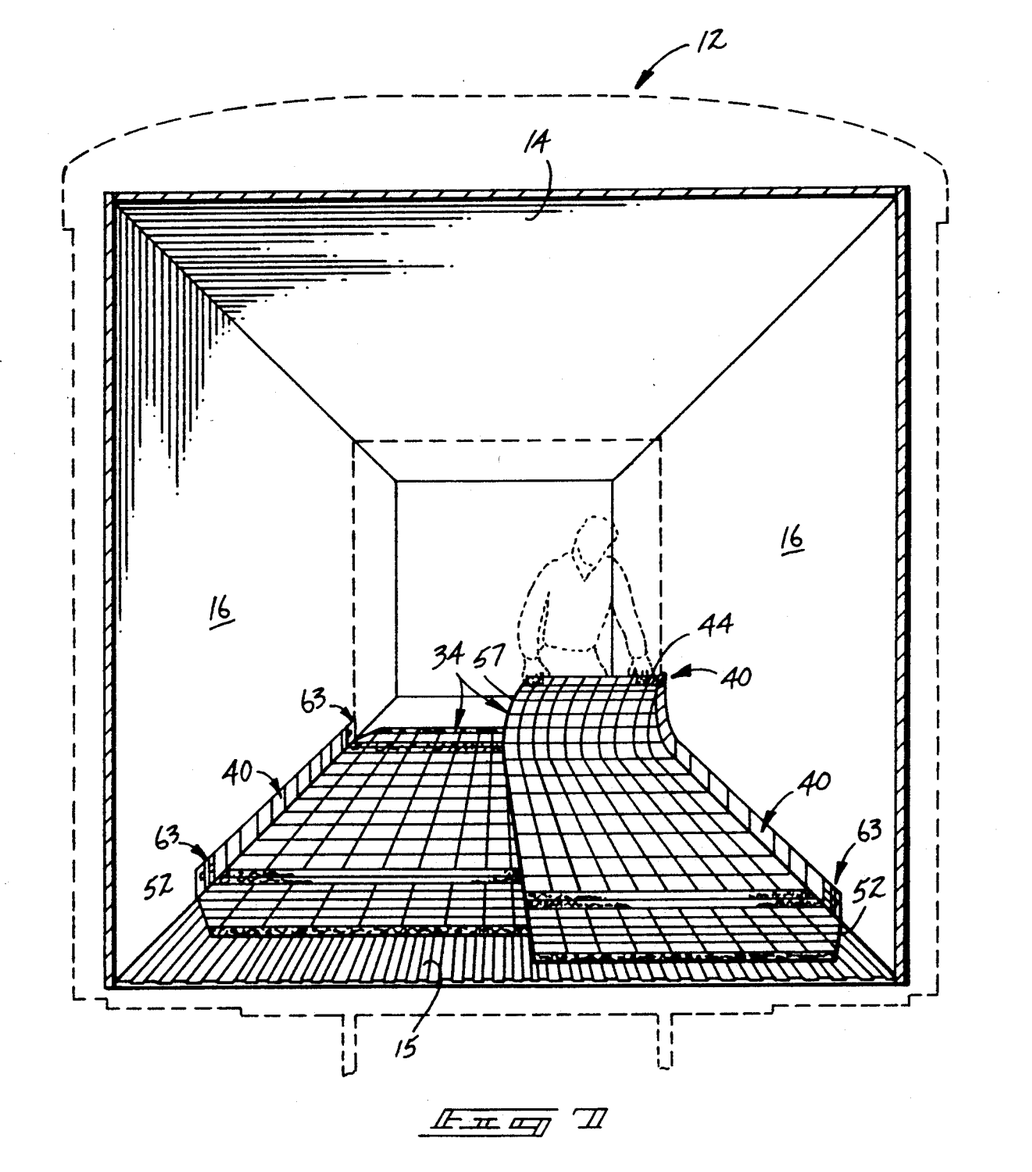
FIG. 7 is a diagrammatic view illustrating an initial step in installing the present thermal barrier.
Figure 8:
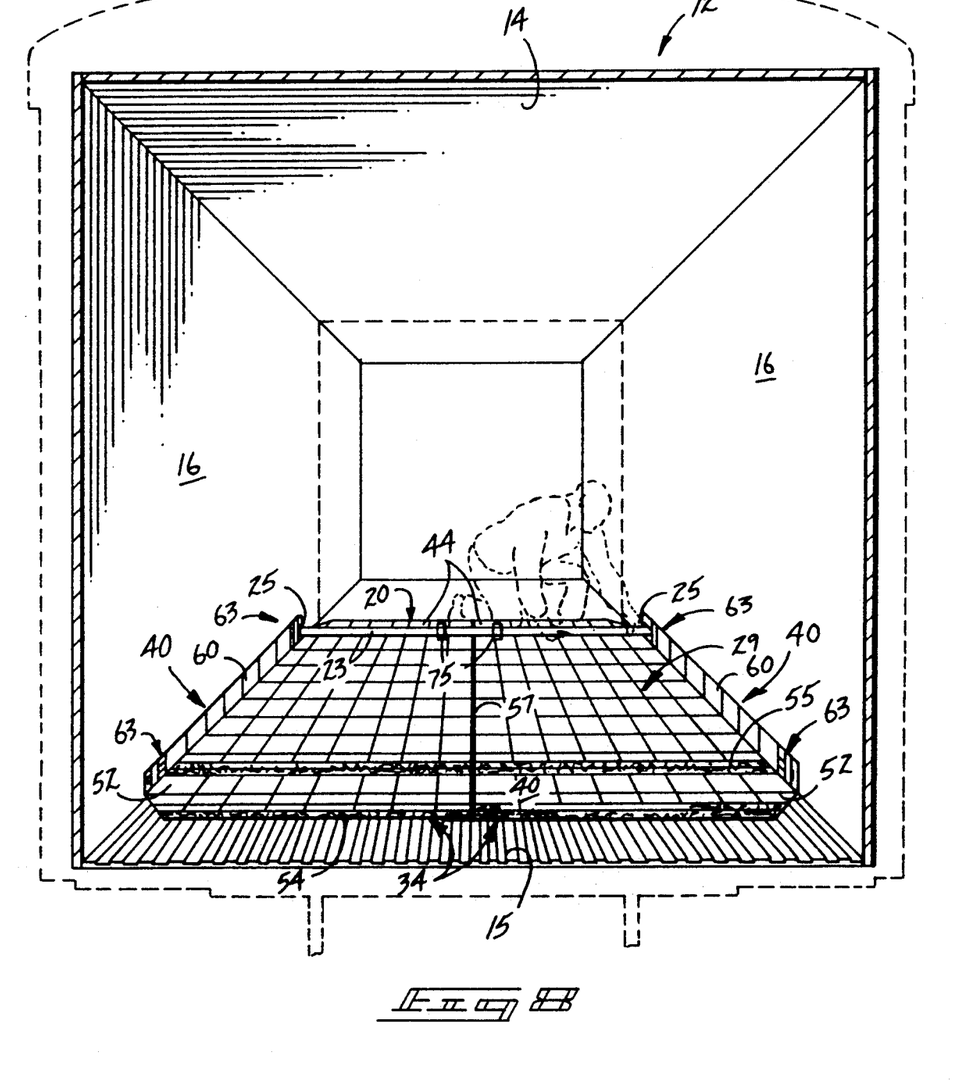
FIG. 8 is a view similar to FIGS. 6 and 7 only showing installation of a load lock.

The installer, shown by dashed lines in FIGS. 6–11, begins by initially checking the interior of the enclosure for any sharp or protruding edges. The thermal sheet forms 34 are then removed from the carrying bag 32 (FIG. 6). The installer carefully unrolls both thermal sheet forms 34, laying them flat on the enclosure floor as they will hang when installed (FIG. 7).

The sheet forms are positioned along the enclosure floor in an overlapping relation such that the side flap sections 60 are folded upright but not tight against the adjacent side wall surfaces of the enclosure (FIG. 7).

Next, the installer slips the load lock feet 25 into the pockets 68 at the top flap section 44. The holding straps 75 are folded over the extensible members 23 to secure the top flap section 44 to the load lock 20. Additionally, the holding straps 70 at the opposed pockets 68 are secured over the load lock extensible members 23 to secure the load lock feet 25 within the pockets 68.

Care is taken at this point to position the load lock so that the rachet lever mechanism 24 will swing away from the adjacent surface of the thermal sheet. This will ensure that the ratchet lever will swing down and over center (FIG. 9) affording maximum leverage to the installer when the top flap section 44 is moved into position near the top wall surface of the enclosure.

Next, the installer loosely gathers the assembled sheet together, bunching the bottom flap section 52 toward the loosely installed load lock 20 and top flap section 44.

The load lock 20 is then grasped and lifted along with the top flap section 44 into position adjacent the top or ceiling 14 of the enclosure (FIG. 9). The installer grasps the load lock with one hand near the center. The installer then lifts the entire assembly off the floor and up to the ceiling 14, pushing hard to guarantee that the pockets 68 will compress well into the corners of the enclosure and against the sidewalls.

The installer takes care at this point to see that the top flap section 44 protrudes over the load lock extensible members 23 so it will not have to be pulled through from the back side.

When the installer is satisfied that the desired vertical closure has been achieved, the rachet mechanism 24 of the load lock 20 may be operated to secure the top flap section 44 in position.

Next, the bottom flap section 52 is positioned and a second load lock 20 is installed using a procedure substantially identical to the procedure for installing the top flap section 44 and load lock 20, as described above. The load lock 20 is inserted with its foot plates 25 within pockets 68 and is secured in position by the holding straps 70.

The bottom load lock 20 is then pushed down to tighten the thermal sheet and to lock it into position adjacent the bottom wall or floor 15. Care is also taken at this time to assure that the bottom flap section 52 projects toward the installer and below the extensible members 23 of the bottom load lock 20.

Now, the installer may pull the top and bottom flap sections 44, 52 over and "slap" the hook-and-loop receiving strips 45, 47 together. This will form a "loop" configuration substantially as shown in FIG. 12.

If it is desired to completely close off the adjacent space within the enclosure, care is taken to assure that the outward flap section surfaces of the sheet engage flush against the adjacent surfaces of the enclosure. However, it may be desirable to maintain an air space of selected dimension between the enclosure surface and the surfaces of the flap sections. This adjustment is accommodated by the overlapping width dimensions of the hook-and-loop fasteners.

To adjust horizontal tension across the sheet, the installer may simply separate the vertical opening defined by the inner edges 57 of the separable sheet forms 34. One hand may be used to pull one of the sheets toward the center of the container while the other hand is used to pull the opposite sheet to the center. The two edges are then "slapped" together to secure the hook-and-loop fasteners.

If a tighter seal is needed at the side walls 16, the installer may simply utilize appropriate rigid brace members such as wooden boards, (not shown) by positioning the boards along the folded side flap sections 60 and placing by a third load lock between the boards.

Furthermore, if a tighter top or bottom seal is needed, additional hook-and-loop fasteners (not shown) may be attached to the enclosure itself to secure the sheet material in position. Conventional adhesive tape backed hook-and-loop receiving strips may be utilized for this purpose.

Disassembly of the unit may be accomplished by reversing the above steps.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

I claim:

1. A portable refrigerated cargo container thermal barrier for use with a load lock having an extensible member with opposed foot plates, to thermally divide a container enclosure including a cross sectional configuration defined at least in part by peripheral wall surfaces, said barrier comprising:

a thermal sheet configured to substantially match the cross sectional configuration of the enclosure, including an edge surface for each peripheral wall surface of the enclosure;

said sheet having sufficient flexibility to enable it to be rolled onto itself for storage; and attachment means comprised of pockets formed into the thermal sheet for receiving the foot plates of the load lock, whereby said thermal sheet may be selectively secured against the enclosure walls to extend across the cross sectional configuration of the enclosure and thereby thermally divide the enclosure.

2. The portable refrigerated cargo container thermal barrier for use with a load lock having an extensible member with opposed foot plates, as claimed by claim 1 wherein the pockets include holding straps selectively engageable to span the pockets and load lock feet, to lock the load lock feet in the pockets.

3. The portable refrigerated cargo container thermal barrier for use with a load lock having an extensible member with opposed foot plates, as claimed by claim 1 wherein the sheet is comprised of two separable sheet forms selectively engageable to span the cross sectional configuration of the enclosure.

4. The portable refrigerated cargo container thermal barrier for use with a load lock having an extensible member with opposed foot plates, as claimed by claim 1 wherein the sheet includes integral peripheral flaps at the edges, said flaps being foldable onto the sheet to form outwardly facing flap surfaces for selective positioning adjacent a selected peripheral wall surface of the enclosure.

5. The portable refrigerated cargo container thermal barrier for use with a load lock having an extensible member with opposed foot plates, as claimed by claim 4 wherein the flaps include side flap sections in opposed relation across the sheet and wherein the attachment means is comprised of pockets formed into the side flap sections.

6. The portable refrigerated cargo container thermal barrier for use with a load lock having an extensible member with opposed foot plates, as claimed by claim 5 wherein the integral peripheral flaps include top and bottom flap sections having fastener means for adjustably securing the top and bottom flap sections wherein the top and bottom flap sections are folded over the sheet, forming outward flap surfaces for selective positioning adjacent to or against associated enclosure walls.

7. The portable refrigerated cargo container thermal barrier for use with a load lock having an extensible member with opposed foot plates, as claimed by claim 6 wherein the fastener means is comprised of first strips of hook and loop fastener material along the top and bottom flap sections and mating second strips of hook and loop fastener material, substantially parallel to the first strips and located on the sheet inward of the first strips.

8. The portable refrigerated cargo container thermal barrier for use with a load lock having an extensible member with opposed foot plates, as claimed by claim 1 wherein the sheet is formed of sheets of quilted reflective flexible sheet material, sandwiching a layer of insulation.

9. The portable refrigerated cargo container thermal barrier for use with a load lock having an extensible member with opposed foot plates, as claimed by claim 8 wherein the quilts are approximately six inches square.

10. A portable refrigerated cargo container thermal barrier for use with a load lock having an extensible member with opposed foot plates, to thermally divide an enclosure including a cross sectional configuration defined at least in part by peripheral wall surfaces, said barrier comprising:
a thermal sheet comprised of two separable sheet forms having selectively engageable inner edges and surface configurations which, when the sheet forms are assembled, span the cross sectional configuration of the enclosure;
wherein each sheet form includes an outer edge for each peripheral wall surface of the enclosure; and
attachment means comprised of pockets formed into the separable sheet forms adjacent to selected outer edges of the sheet forms for receiving the foot plates of the load lock, such that said sheet forms may be selectively secured against the enclosure walls to extend across the cross sectional configuration of the enclosure and thermally divide the enclosure.

11. The portable refrigerated cargo container thermal barrier for use with a load lock having an extensible member with opposed foot plates, as claimed by claim 10 wherein the pockets include holding straps selectively engageable to span the pockets and load lock feet, to lock the load lock feet in the pockets.

12. The portable refrigerated cargo container thermal barrier for use with a load lock having an extensible member with opposed foot plates, as claimed by claim 10 wherein the thermal sheet includes integral peripheral flaps at outer edges thereof, said flaps including at least one flap section being foldable onto the thermal sheet to form an outwardly facing flap surface for selective positioning adjacent a selected peripheral wall surface of the enclosure.

13. The portable refrigerated cargo container thermal barrier for use with a load lock having an extensible member with opposed foot plates, as claimed by claim 12 wherein the sheet forms each include a flap section and wherein the sheet forms are assemblable such that the flap sections are in opposed relation across the assembled thermal sheet and wherein the attachment means is comprised of pockets formed into the thermal sheet.

14. The portable refrigerated cargo container thermal barrier for use with a load lock having an extensible member with opposed foot plates, as claimed by claim 13 wherein each sheet form includes fastener means for adjustably joining the sheet forms together and for securing the flap section in folded relation over the thermal sheet and forming an outward flap surface for flush engagement with an enclosure wall.

15. A portable refrigerated cargo container thermal barrier for use to thermally divide a container enclosure including a cross sectional configuration defined at least in part by peripheral wall surfaces, said barrier comprising:
a load lock having an extensible member with opposed foot plates;
a thermal sheet configured to substantially match the cross sectional configuration of the enclosure, including an edge for each peripheral wall surface of the enclosure; and
pockets on adjacent selected edges of the sheet for receiving the foot plates of the load lock, whereby said thermal sheet may be selectively secured against the enclosure walls to extend across the cross sectional configuration of the enclosure and thereby thermally divide the enclosure.

16. The portable refrigerated cargo container thermal barrier for use to thermally divide an enclosure as defined by claim 15 wherein the thermal sheet is sufficiently flexible to be rolled onto itself for storage.

17. A portable refrigerated cargo container thermal barrier for use to thermally divide a container enclosure including a cross sectional configuration defined at least in part by peripheral wall surfaces, said barrier comprising:
a load lock having an extensible member with opposed foot plates;
a thermal sheet configured to substantially match the cross sectional configuration of the enclosure, including an edge for each peripheral wall surface of the enclosure;
attachment means on adjacent selected edges of the sheet for receiving the foot plates of the load lock, whereby said thermal sheet may be selectively secured against the enclosure walls to extend across the cross sectional configuration of the enclosure and thereby thermally divide the enclosure; and wherein the sheet includes integral peripheral flaps at the edges, with at least two flap sections being foldable onto the sheet to form outwardly facing edge surfaces for selective positioning adjacent a selected peripheral wall surface of the enclosure.

18. A portable refrigerated cargo container thermal barrier for use with a load lock having an extensible member with opposed foot plates, to thermally divide a container enclosure including a cross sectional configuration defined at least in part by peripheral wall surfaces, said barrier comprising:

a thermal sheet configured to substantially match the cross sectional configuration of the enclosure, including an edge surface for each peripheral wall surface of the enclosure;

attachment means positioned on the sheet for receiving the foot plates of the load lock, whereby said thermal sheet may be selectively secured against the enclosure walls to extend across the cross sectional configuration of the enclosure and thereby thermally divide the enclosure; and wherein the sheet includes integral peripheral flaps at the edges, said flaps being foldable onto the sheet to form outwardly facing flap surfaces for selective positioning adjacent a selected peripheral wall surface of the enclosure.

19. A portable refrigerated cargo container thermal barrier for use with a load lock having an extensible member with opposed foot plates, to thermally divide a container enclosure including a cross sectional configuration defined at least in part by peripheral wall surfaces, said barrier comprising:

a thermal sheet configured to substantially match the cross sectional configuration of the enclosure, including an edge surface for each peripheral wall surface of the enclosure; and attachment means on the sheet releasably receivable over the foot plates of the load lock for releasably attaching the sheet to the load lock foot, whereby said thermal sheet may be selectively secured by the load lock against the enclosure walls to extend across the cross sectional configuration of the enclosure and thereby thermally divide the enclosure.

* * * * *